United States Patent [19]

Takabatake

[11] Patent Number: 5,631,027
[45] Date of Patent: May 20, 1997

[54] SUPPORT STRUCTURE FOR SUPPORTING FOAMABLE MATERIAL ON HOLLOW STRUCTURAL MEMBER

[75] Inventor: Yoshihiro Takabatake, Aichi-ken, Japan

[73] Assignee: Neo-Ex Lab, Inc., Aichi-ken, Japan

[21] Appl. No.: 688,280

[22] Filed: Jul. 29, 1996

[30] Foreign Application Priority Data

Jul. 31, 1995 [JP] Japan .................................. 7-195079

[51] Int. Cl.$^6$ ........................... B29C 39/02; B29C 39/22
[52] U.S. Cl. ............................. 425/4 R; 249/91; 264/41; 425/383; 425/817 R
[58] Field of Search ......................... 425/4 R, 817 R, 425/383; 249/91, 96, 97; 264/41

[56] References Cited

U.S. PATENT DOCUMENTS

| | | | |
|---|---|---|---|
| 3,493,449 | 2/1970 | Krug | 425/4 R |
| 3,915,774 | 10/1975 | Dobson | 425/4 R |
| 4,047,860 | 9/1977 | Dinzburg et al. | 425/4 R |
| 5,582,388 | 12/1996 | Baxter | 249/91 |

FOREIGN PATENT DOCUMENTS

2-276836  11/1990  Japan .

*Primary Examiner*—Khanh P. Nguyen
*Attorney, Agent, or Firm*—Dennison, Meserole, Pollack & Scheiner

[57] ABSTRACT

A support structure including a foamable material located in a cavity of a hollow structural member for blocking the cavity of the hollow structural member when it is foamed by external heating, and a support member for supporting the foamable material. The foamable material has a plate-like shape and has an external dimension smaller than the dimension of the cross section of the cavity. The support member is disposed in the cavity and mounted on the hollow structural member by a mounting device. The support member is constituted of a pair of support plates for supporting both side surfaces of the foamable material and a desired number of connecting pieces located along a lower periphery of the support plates for integrally connecting the support plates. The support plates are adapted to be elastically spread and narrowed about the connecting pieces and being directed to an exterior surface of the hollow structural member at an upper periphery thereof.

8 Claims, 6 Drawing Sheets

SUPPORT STRUCTURE FOR SUPPORTING FOAMABLE MATERIAL ON HOLLOW STRUCTURAL MEMBER

BACKGROUND OF THE INVENTION

1. Field of the Invention

The present invention relates to a support structure for supporting a foamable material on a hollow structural member, and more particularly to a support structure for supporting a foamable material in a cavity of a closed box-like hollow structural member constituted of a plurality of pieces of plates, such as pillars, rocker panels, roof side panels and hood panels of a vehicle body, in order that the foamable material blocks the cavity of the hollow structural member to increase damping powers, sound insulation powers and other powers of the hollow structural member when it is foamed by external heating.

2. Description of the Prior Art

Figure 9:
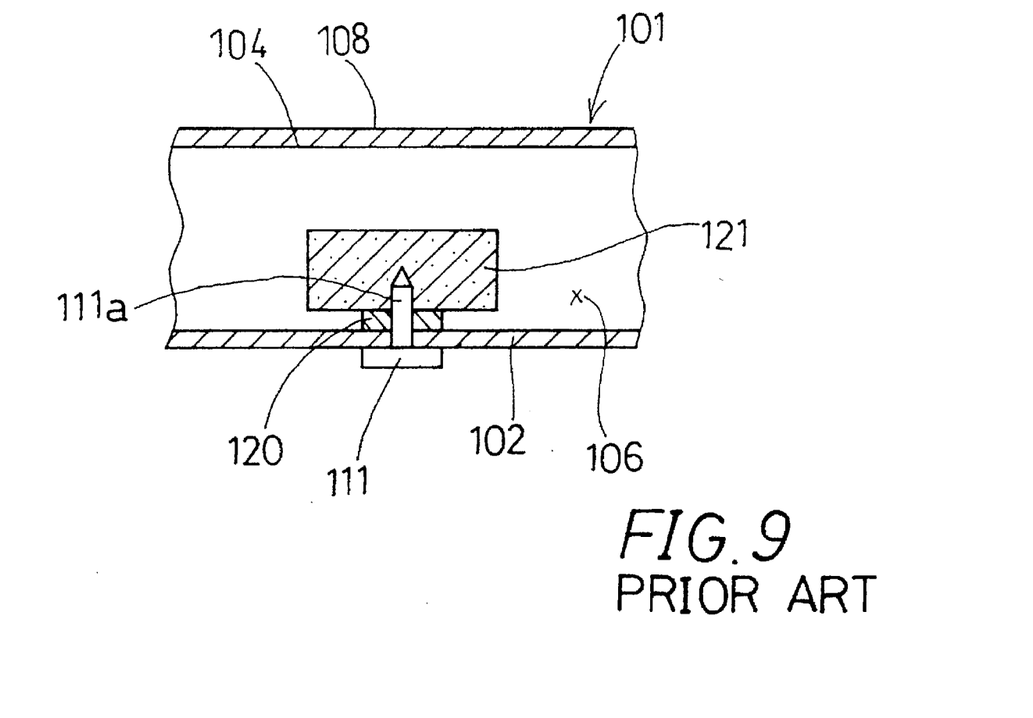
FIG. 9 is a sectional view showing a conventional support structure of a foamable material before the foamable material is foamed and expanded.
Figure 10:
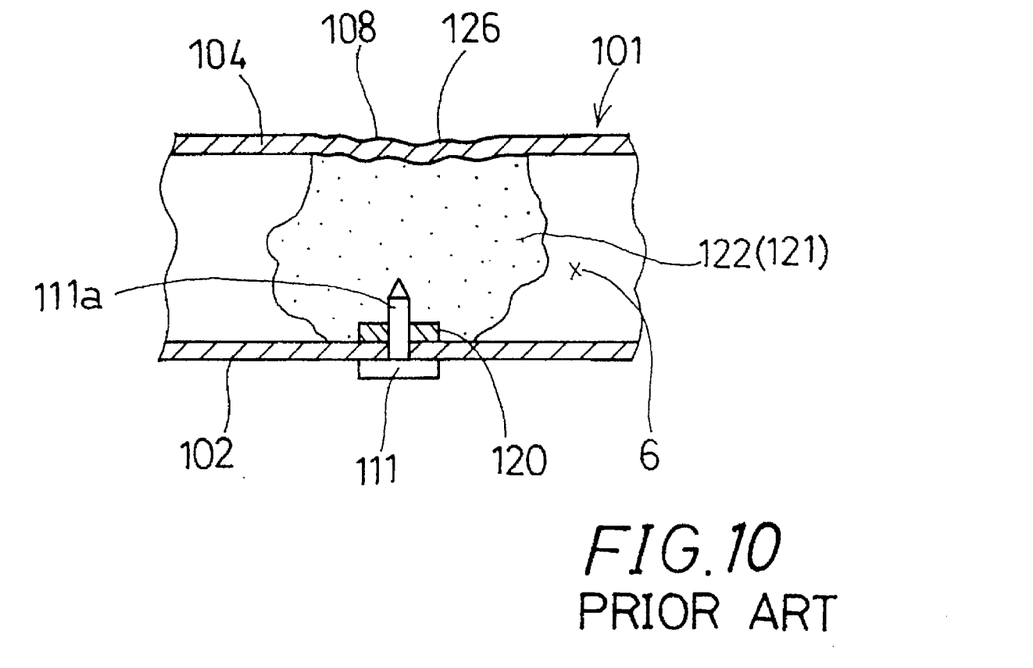
FIG. 10 is a sectional view showing the conventional support structure after the foamable material is foamed and expanded.

FIGS. 9 and 10 exemplarily show a conventional support structure. In this support structure, to support a foamable material 121 in a cavity 106 of a closed box-like hollow structural member 101 which is constituted of an inner pillar panel 102 and an outer pillar panel 104, a bolt 111 having a threaded section 111a is mounted on the inner pillar panel 102 so that the threaded section 111a projects into the cavity 106 at a desired length. The threaded section 111a is then provided with a washer 120. The foamable material 121 engages the threaded section 111a so as to be seated on the washer 120. Thus, the foamable material 121 is supported in a cavity 106 of the hollow structural member 101.

Such a support structure of the foamable material as described above is disclosed, for example, in Japanese Laid-Open Patent Publication No. 2-276836 (corresponding to British Patent Application No. 8903211.4).

In the above-noted conventional support structure of the foamable material in which the foamable material 121 engages the threaded section 111a of the bolt 111 which projects into the cavity 106 of the hollow structural member 101, the foamable material 121 biases the inner surfaces of the inner and outer panels 102 and 104 and adheres thereto when it is foamed and expanded by external heating, thereby blocking the cavity 106 of the hollow structural member 101.

As shown in FIG. 10, the foamable material 121, when heated by external heating, is foamed and expanded to form a foamed product 122. The foamed product 122, when cooled, is contracted at an inherent contraction rate, thereby generating a contraction force. Such a contraction force causes formation of an uneven surface or distortional surface 126 on a corresponding outer surface area 108 of the outer panel 104 to which the foamed product 122 is bonded.

Particularly, in a case that the outer surface of the outer panel 104 is used as an open or exposed surface, the hollow structural member 101 may have undesirable awkward appearance resulting from such distortional surface 126.

SUMMARY OF THE INVENTION

It is an object of the invention to provide a support structure for supporting a foamable material in a cavity of a hollow structural member in which the problems associated with the conventional support structure can be eliminated, that is, a distortional surface on an outer surface of a hollow structural member caused by contraction of a foamable material as foamed can be effectively eliminated.

In order to attain the object, the present invention provides a support structure including a foamable material located in a cavity of a hollow structural member for blocking the cavity of the hollow structural member when it is foamed by external heating, and a support member for supporting the foamable material. The foamable material has a plate-like shape and has an external dimension smaller than the dimension of the cross section of the cavity. The support member is disposed in the cavity and mounted on the hollow structural member by a mounting device. The support member is constituted of a pair of support plates for supporting both side surfaces of the foamable material and a desired number of connecting pieces located along a lower periphery of the support plates for integrally connecting the support plates. The support plates are adapted to be elastically spread and narrowed about the connecting pieces and being directed to an exterior surface of the hollow structural member at an upper periphery thereof.

With this support structure, the foamable material is supported between the support plates of the support member. The support member is disposed in the cavity and mounted on the hollow structural member by the mounting device. When the foamable material is foamed and expanded to form a foamed product by external heating, the support plates are elastically spread about the connecting pieces, and simultaneously, the foamed product thus formed is adhered to an inner circumferential surface of the hollow structural member. As a result, the cavity is blocked by the support member and the foamed product.

When the foamed product is cooled and contracted, the support plates inwardly force the foamed product by an elastic restoring force thereof, thereby forcing the foamed product to the exterior surface of the hollow structural member against a contraction force of the foamed product. This may effectively prevent formation of an uneven surface or distortional surface on the exterior surface of the hollow structural member.

Each of the support plates may be inwardly provided with a shoulder portion extending along the upper periphery thereof. With this construction, the shoulder portion obstructs contraction of the foamed product. This may assist in preventing formation of the distortional surface on the exterior surface of the hollow structural member caused by the contraction of the foamed product.

Each of the support plates may include an outwardly projected reinforcement member provided on a substantially lower half area thereof. With this construction, the reinforcement member permits spreading of the support plates without risk of structural deformation or damage when the foamable material is foamed and expanded.

The mounting device may be an engagement pin integrally formed on one of the connecting pieces. The engagement pin elastically engages an aperture formed on the hollow structural member when it is forced into the aperture, thereby to retain the support member in the cavity. With this construction, the support member for retaining the foamable material is disposed in the cavity of the hollow structural member only by inserting the engagement pin into the aperture formed in the hollow structural member. Thus, the support member can be easily, speedily and reliably positioned in the cavity.

The present invention will become more fully apparent from the following description as it proceeds in connection with the drawings.

DETAILED DESCRIPTION OF THE PREFERRED EMBODIMENTS

Preferred embodiments of the invention will now be described in detail with reference to the drawings.

Figure 1:
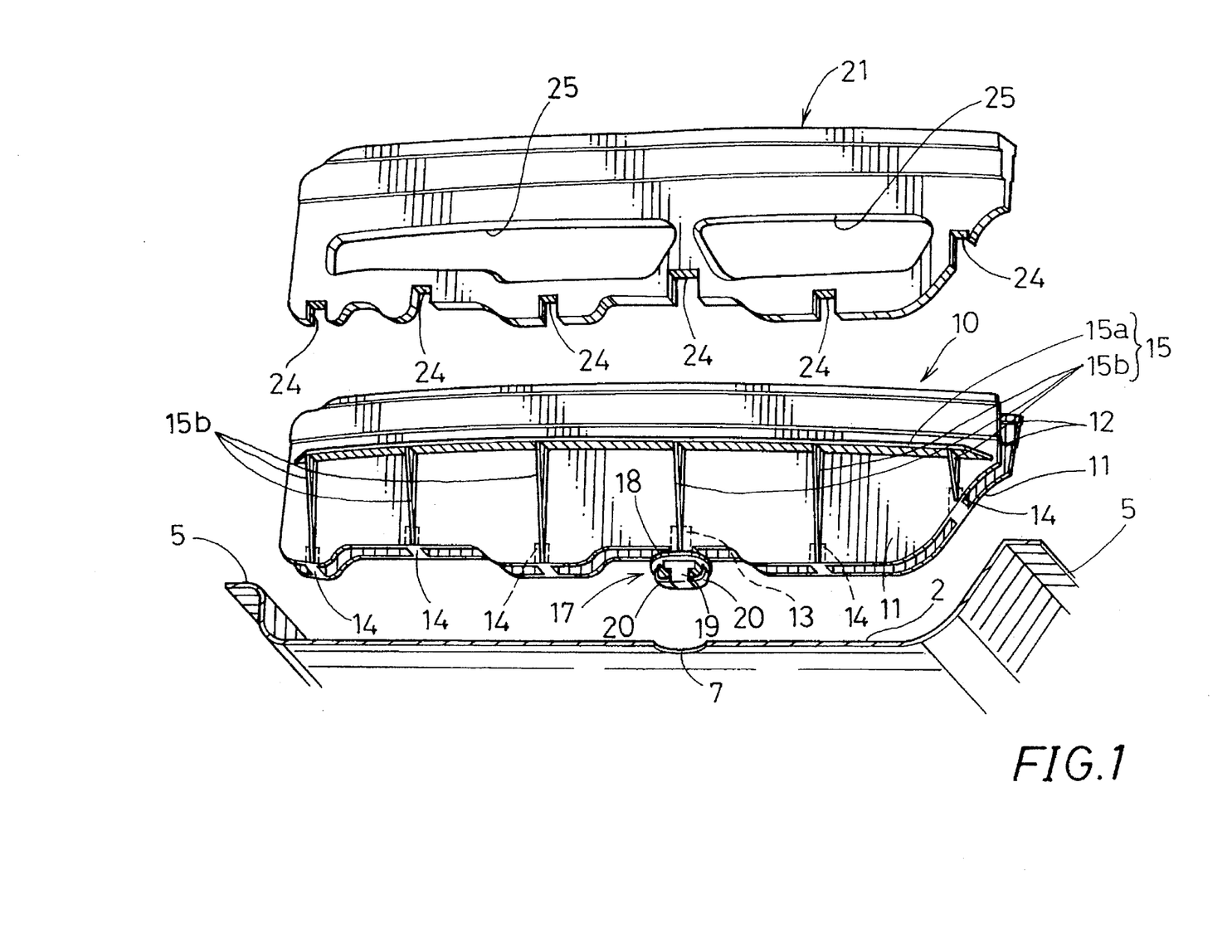
FIG. 1 is a perspective view of a support structure according to a first embodiment of the present invention, in which a support member and a foamable material are shown in separated relation.
Figure 2:
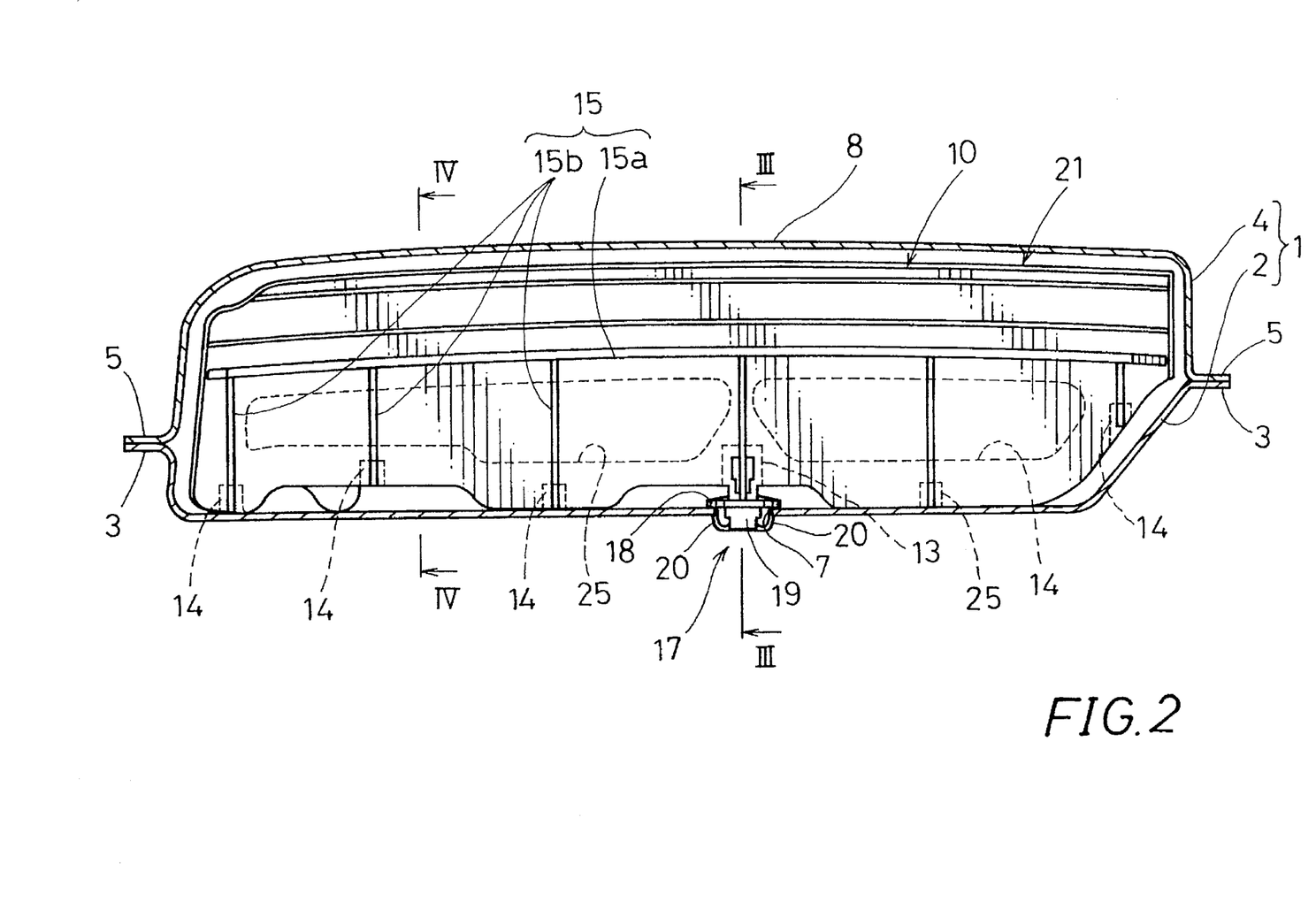
FIG. 2 is a side view of the support member and the foamable material as assembled and located in a cavity of a hollow structural member.

Referring to FIGS. 1 to 6, shown therein is a first embodiment of the invention. As shown in FIGS. 1 and 2, a pillar 1 of a vehicle body is exemplified as a hollow structural member. As best shown in FIG. 2, the pillar 1 is constituted of an inner pillar panel 2 having a flange 3 and an outer pillar panel 4 having a flange 5. In this pillar 1, an outer surface 8 of the outer panel 4 is used as an exposed surface. The inner and the outer pillar panels 2 and 4 are welded at the flanges 3 and 5 by spot welding to form the pillar 1 into a closed box-like hollow body including a cavity 6 therein. The inner pillar panel 2 is provided with an aperture 7 into which an engagement pin 17 is non-rotatably inserted, as will be hereinafter described. The aperture 7 has an elongated configuration, that is, an oval, rectangular or other non-circular configuration. The cavity 6 of the pillar 1 receives a plate-like foamable material 21 which blocks the cavity 6 when it is foamed and expanded by external heating. The foamable material 21 is retained by a support member 10 which is disposed in the cavity 6. The support member 10 is constituted of a pair of support plates 11 which may support both side surface of the foamable material 21. The support plates 11 are spaced apart by a desired distance to snugly receive the foamable material 21 therebetween.

The support plates 11 are disposed in the cavity 6 so as to be perpendicular to a longitudinal direction of the cavity 6. Also, the support plates 11 are configured substantially to conform to the transverse cross-sectional configuration of the cavity 6 and has an external dimension slightly smaller than the dimension of the cross section of the cavity 6. The support plates 11 are interconnected through spacers or connecting pieces 13 and 14 interposed in parallel therebetween. The connecting pieces 13 and 14 are dimensioned to space apart the support plates 11 by a desired distance. Further, the connecting pieces 13 and 14 are located along the lower periphery of the support plates 11 so that the support plates 11 are elastically spread and narrowed about the connecting pieces 13 and 14. As will be recognized, the support plates 11 are directed to the outer surface 8 of the outer pillar panel 4 at the upper periphery thereof.

Each support plate 11 is inwardly provided with two rows of shoulder portions 12 which extend along the upper periphery thereof. The shoulder portions 12 may effectively obstruct contraction of the foamable material 21 as foamed by heating. Moreover, each support plate 11 includes a outwardly projected reinforcement member 15 which is provided on a substantially lower half area thereof. The reinforcement member 15 is constituted of a transverse rib 15a extending over the entire length of the support plate 11, and a plurality of transversely spaced vertical ribs 15b extending from the transverse rib 15a to the lower periphery of the support plate 11.

The engagement pin 17 as a mounting device for mounting the support member 10 is integrally formed on the peripheral edge of the support plates 11 so as to correspond to the aperture 7 formed on the inner pillar panel 2. In the illustrated embodiment, the engagement pin 17 is integrally formed on an outer end surface of the central connecting piece 13 which is arranged to correspond to the aperture 7. The engagement pin 17 elastically engages the aperture 7 when it is forced into the aperture 7, thereby to retain the support member 10 in the cavity 6 of the pillar 1. The engagement pin 17 includes a base 18 which is greater than the aperture 7 in length and width, a leg 19 axially projected from a seating surface of the base 18, and a pair of elastically deformable engagement lips 20 laterally projected from a projected end of the leg 19. Further, each engagement lip 20 includes a finger portion which may elastically engage a peripheral edge of the aperture 7 to prevent slipping off of the engagement pin 17 when the leg 19 is completely forced in the aperture 7.

In this embodiment, the support plates 11, the connecting pieces 13 and 14, the reinforcement member 15, and the engagement pin 17 are integrally formed by injection molding of a synthetic resin.

Figure 3:
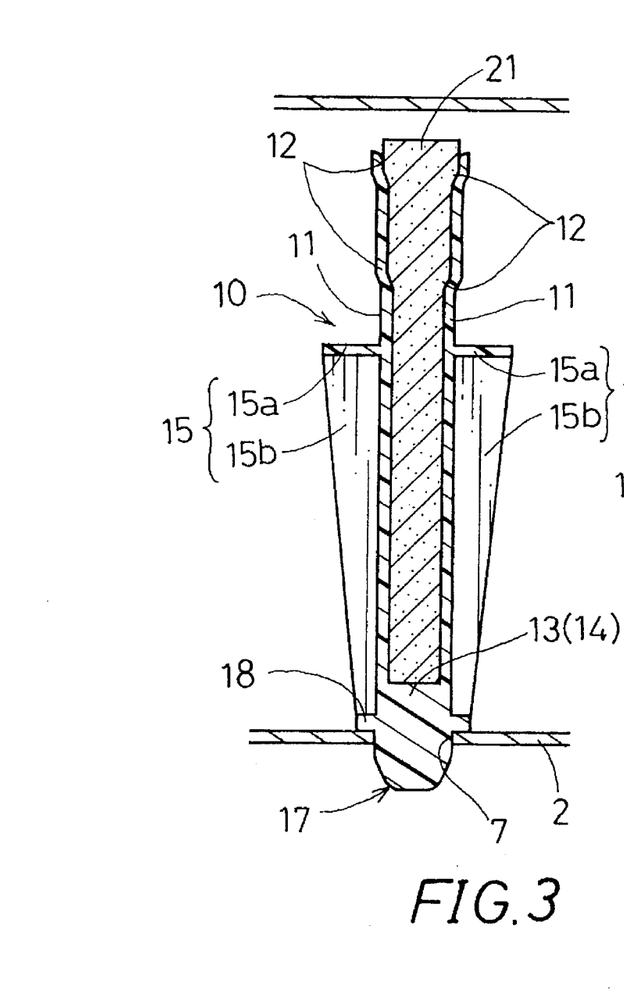
FIG. 3 is a sectional view taken along line III—III of FIG. 2 before the foamable material is foamed and expanded.
Figure 5:
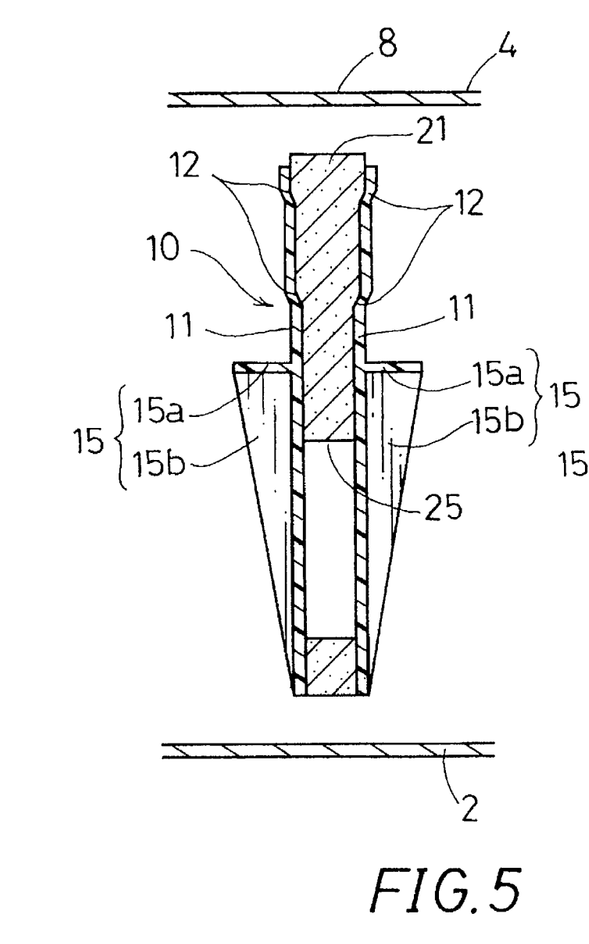
FIG. 5 is a sectional view taken along line IV—IV of FIG. 2 before the foamable material is foamed and expanded.

The foamable material 21 is made of a material which may be foamed and expanded to a foamed product 22 at a temperature from 110° C. to 190° C. As shown in FIGS. 3 and 5, the foamable material 21 is received between the support plates 11 in an unfoamed state.

As best shown in FIG. 1, the foamable material 21 is formed by injection molding or extrusion molding and is shaped substantially to conform to the support plates 11 in configuration and external dimension. Further, as shown in FIG. 3, the foamable material 21 has a thickness equal to or smaller than the distance between the support plates 11 so as to be snugly fitted therebetween.

Further, as shown in FIG. 1, the foamable material 21 to be inserted between the support plates 11 has removed portions or slits 24 which may engage the connecting pieces 13 and 14 when it is received between the support plates 11.

Additionally, as best shown in FIG. 1, the foamable material 21 includes cutout portions or openings 25 at the lower half area thereof. This may reduce costs for forming the foamable material 21. This may also prevent an excessive spread of the support plates 11 at the lower half area thereof when the foamable material 21 is foamed and expanded.

The foamable material 21 may be a foamable material disclosed in Japanese Laid-Open Patent Publication No. 2-276836. The foamable material is foamed and cured at a temperature from 110° C. to 190° C. to provide a closed cell type foamed product.

The formulation of the foamable material as disclosed is set forth below, on a weight percent basis.

| | |
|---|---|
| Copolymer of ethylene and methyl acrylate (MI 0.7, MA 15% by weight) | 63.55 |
| LDPE (melting point 1.5° C., density 0.919) | 27.15 |
| 4,4'-di,tert butyl peroxy n-butyl valerate (Trigonox 29/40) | 0.63 |
| bis (tert butyl peroxy isopropyl) benzene (Perkadox 14/40) | 1.63 |
| benzene sulphonyl hydrazide (Cellogen OT) | 3.62 |
| Azodicabonamide (Porofor ADC-K) | 1.81 |
| di-ethylene glycol (DEG) | 1.81 |

The Porofor component contains zinc which activates the blowing activity of the foamable material.

As will be recognized, the foamable material 21 is not restricted to the composition described above and may be various types of materials which can be foamed and expanded by heating.

Processes for incorporating the foamable material 21 to the pillar 1 and subsequent operations will now be described.

The foamable material 21 as unfoamed is previously positioned between the support plates 11 while engaging the slits 24 with the connecting pieces 13 and 14. Thus, the foamable material 21 is properly positioned and retained on the support member 10.

The support member 10 with the foamable material 21 is introduced into the inner pillar panel 2, and the engagement pin 17 provided on the support plates 11 is inserted into the aperture 7 of the inner pillar panel 2. When the leg 19 of the engagement pin 17 is completely forced into the aperture 7, the finger portions of the engagement lips 20 are engaged with the longitudinal peripheral edges of the aperture 7 to prevent rotation and slipping off of the engagement pin 17. Thus, the foamable material 21 is positioned on the inner pillar panel 2 together with the support member 10.

Subsequently, the inner and the outer pillar panels 2 and 4 are welded at the flanges 3 and 5 thereof by spot welding to form the pillar 1 having the closed box-like hollow shape and encapsulating the foamable material 21 therein.

Thereafter, the pillar 1 with the foamable material 21 is heated by external heating, for example, by external heating for baking finishing of the automobile body. Consequently, as shown in FIGS. 4 and 6, the foamable material 21 is foamed and expanded to produce the foamed product 22.

Figure 4:
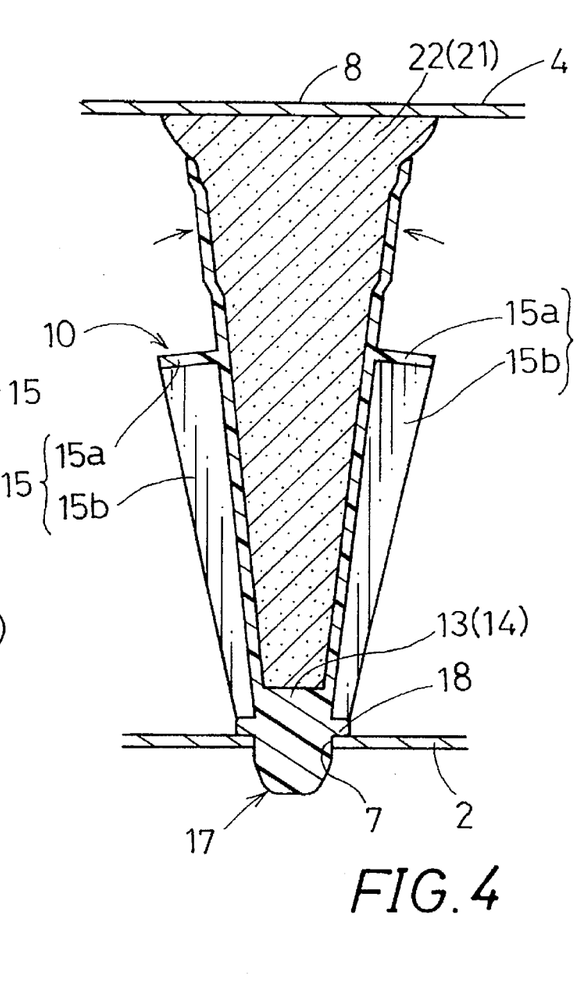
FIG. 4 is a sectional view taken along line III—III of FIG. 2 after the foamable material is foamed and expanded.
Figure 6:
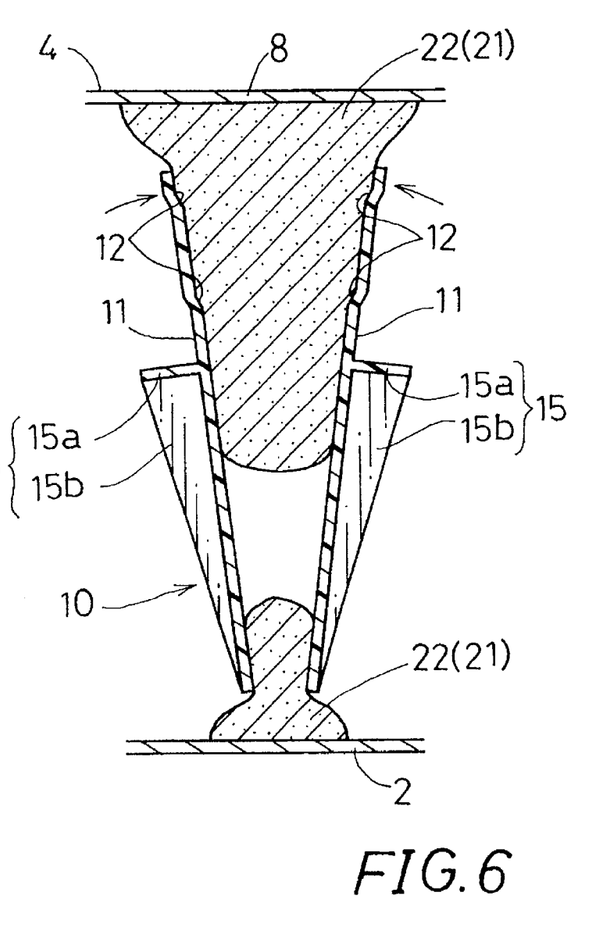
FIG. 6 is a sectional view taken along line IV—IV of FIG. 2 after the foamable material is foamed and expanded.

When the foamable material 21 is foamed and expanded to form the foamed product 22, as shown in FIGS. 4 and 6, the support plates 11 are elastically spread about the connecting pieces 13 and 14, and simultaneously, the foamed product 22 thus produced is reliably adhered to an inner circumferential surface of the pillar 1. As a result, the cavity 6 is effectively blocked by the support member 10 and the foamed product 22.

The foamed product 22 is then cooled. As will be recognized, the foamed product 22 is contracted by cooling, thereby generating a contraction force which may generally acts as a stress to deform the outer panel 4. However, the support plates 11 as spread has an elastic restoring force which may inwardly force the foamed product 22. Such a restoring force may overcome the contraction force of the foamed product 22, thereby forcing the foamed product 22 to the outer panel 4. Also, the shoulder portions 12 may additionally obstruct the contraction of the foamed product 22. This may assist the support plates 11 to force the foamed product 22 to the outer panel 4. Thus, the outer surface area 8 of the outer panel 4 may be successfully protected against formation of an uneven surface or distortional surface caused by the contraction of the foamed product 22.

Figure 7:
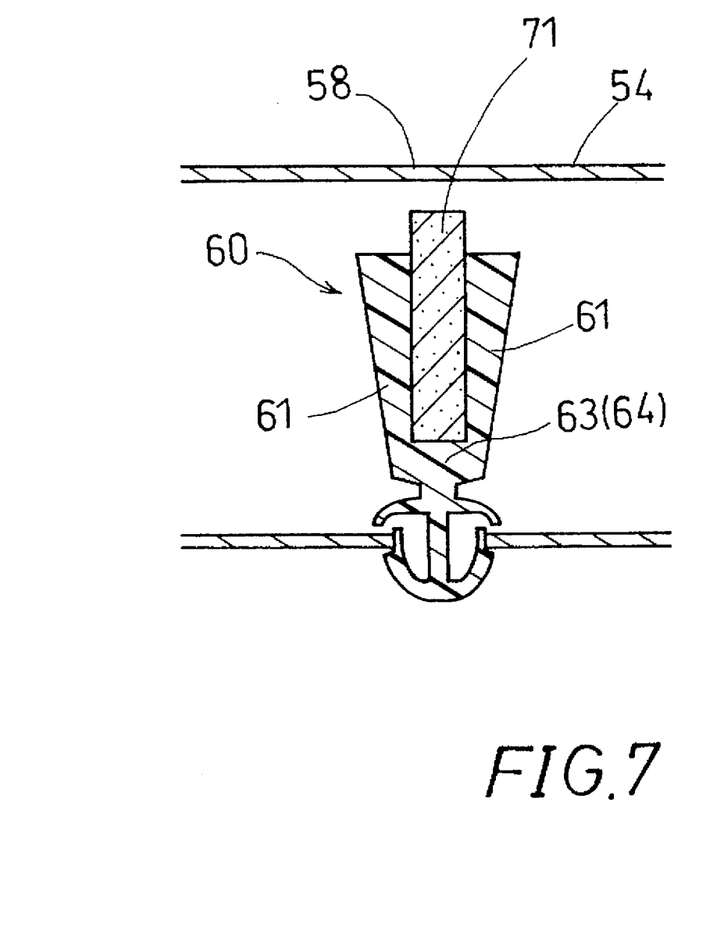
FIG. 7 is a sectional view similar to FIG. 3 showing a support structure according to a second embodiment of the present invention.
Figure 8:
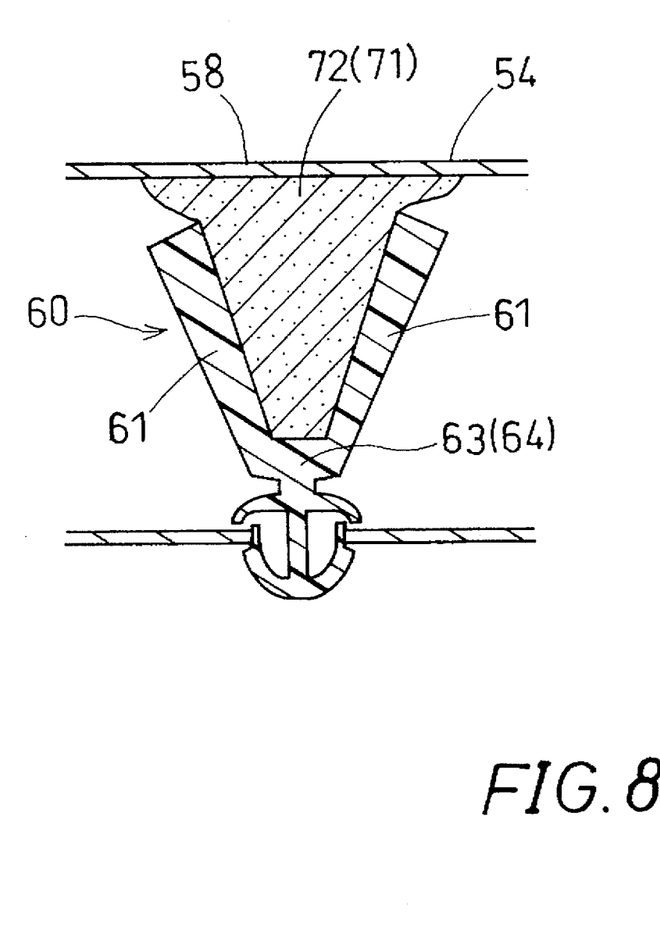
FIG. 8 is a sectional view similar to FIG. 4.

Referring now to FIGS. 7 and 8, shown therein is a second embodiment of the invention. This embodiment is partial modification of the first embodiment. Therefore, a construction which is different from that in the first embodiment will be explained.

In this embodiment, as shown in FIGS. 7 and 8, the support member 60 is constituted of a pair of support plates 61 each of which has a thickness greater than that of the support plate 11 in the first embodiment. Further, the support plate 61 is gradually thinned from the upper periphery to the lower periphery so as to be easily spread about the connecting pieces 63 and 64. As will be apparent from the drawings, each support plate 61 does not include a reinforcement member corresponding to the reinforcement member 15 in the first embodiment since the support plate 61 has an increased strength because of greater thickness thereof.

Like the support plates 11 of the first embodiment, the support plates 61 of this embodiment may function so that the outer surface area 58 of the outer panel 54 may be successfully protected against formation of an uneven surface or distortional surface caused by contraction of the foamed product 72.

Moreover, in the first and the second embodiments, the pillar of a vehicle body is exemplified as the hollow structural member. However, the hollow structural member is not limited to the pillar and may be a rocker panel or a roof side panel of a vehicle body. Further, the hollow structural member is not limited to parts of a vehicle body.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A support structure for supporting a foamable material on a hollow structural member, comprising:

a foamable material located in a cavity of a hollow structural member for blocking the cavity of the hollow structural member when it is foamed by external heating, said foamable material having a plate-like shape and having an external dimension smaller than the dimension of the cross section of the cavity; and a support member for supporting said foamable material, said support member being disposed in the cavity and mounted on the hollow structural member by a mounting device, said support member comprising a pair of support plates for supporting both side surfaces of said foamable material and a desired number of connecting pieces located along a lower periphery of said support plates for integrally connecting said support plates, said support plates being adapted to be elastically spread and narrowed about said connecting pieces and being directed to an exterior surface of the hollow structural member at an upper periphery thereof.

2. The support structure as defined in claim 1, wherein each of said support plates is inwardly provided with a shoulder portion extending along the upper periphery thereof for obstructing contraction of the foamable material as foamed by heating.

3. The support structure as defined in claim 1, wherein each of said support plates includes an outwardly projecting reinforcement member provided on a substantially lower half area thereof.

4. The support structure as defined in claim 2, wherein each of said support plates includes an outwardly projecting reinforcement member provided on a substantially lower half area thereof.

5. The support structure as defined in claim 1, wherein said mounting device comprises an engagement pin integrally formed on one of said connecting pieces, said engagement pin elastically engaging an aperture formed in the hollow structural member when it is forced into the aperture, thereby to retain the support member in the cavity.

6. The support structure as defined in claim 2, wherein said mounting device comprises an engagement pin integrally formed on one of said connecting pieces, said engagement pin elastically engaging an aperture formed in the hollow structural member when it is forced into the aperture, thereby to retain the support member in the cavity.

7. The support structure as defined in claim 3, wherein said mounting device comprises an engagement pin integrally formed on one of said connecting pieces, said engagement pin elastically engaging an aperture formed in the hollow structural member when it is forced into the aperture, thereby to retain the support member in the cavity.

8. The support structure as defined in claim 4, wherein said mounting device comprises an engagement pin integrally formed on one of said connecting pieces, said engagement pin elastically engaging an aperture formed in the hollow structural member when it is forced into the aperture, thereby to retain the support member in the cavity.

* * * * *